United States Patent [19]

Aritaka et al.

[11] Patent Number: 4,891,783
[45] Date of Patent: Jan. 2, 1990

[54] DATA TERMINAL DEVICE

[75] Inventors: Akitoshi Aritaka, Kasuga; Norio Komaki, Kurume, both of Japan

[73] Assignee: Matsushita Electric Industrial Co., Ltd., Osaka, Japan

[21] Appl. No.: 1,968

[22] Filed: Jan. 8, 1987

[30] Foreign Application Priority Data

Jan. 8, 1986 [JP] Japan ................................. 61-1716

[51] Int. Cl.⁴ ............................................ G06F 13/42
[52] U.S. Cl. ............................ 364/900; 364/940.81; 364/929
[58] Field of Search ... 364/200 MS File, 900 MS File; 375/8, 117

[56]  References Cited

U.S. PATENT DOCUMENTS 4,281,315  7/1981  Bauer et al. ...................... 364/200 X
4,368,512  1/1983  Kyu et al. ............................ 364/200
4,688,170  8/1987  Waite et al. .......................... 364/200

Primary Examiner—Thomas M. Heckler
Attorney, Agent, or Firm—Wenderoth, Lind and Ponack

[57] ABSTRACT

A data terminal device, having a plurality of protocols stored therein, has a data transmitting mode and a data receiving mode. When in a transmitting mode, the terminal device transmits to another data terminal initial data according to one of the protocols. The terminal device then awaits a feed back signal from the other terminal device. If a feed back signal is received, the terminal device transmits the data. If no feed back signal is received, the terminal device transmits a break signal which indicates that a change in receiving protocol is required. When in a receiving mode, the terminal device receives data according to one of the protocols. If data is received having the same protocol as that of the receiver of the terminal device, a feed back signal is transmitted to the other terminal device. If the data protocol received is different, no feed back signal is transmitted, and the terminal device awaits a break signal indicating that change in receiving protocol is required.

3 Claims, 3 Drawing Sheets

DATA TERMINAL DEVICE

BACKGROUND OF THE INVENTION

The present invention relates to a data terminal device for communicating digitally coded information through an information distribution network such as a telephone network.

A data terminal device communicates digitally coded information according to a predetermined protocol which defines the band ratio, the bit number of the data and so on. If a protocol, which defines the format of the data, is transmitted from a data terminal device in a transmitting mode, and is different from a protocol of a data terminal device in a receiving mode, the digitally coded data communication cannot be maintained between the data terminal device in the transmitting mode and the data terminal device in the receiving mode.

Therefore, the protocol of the data which is transmitted by the data terminal device in the transmitting mode, should coincide with the protocol of the data terminal device in the receiving mode. To correspond both protocols with each other, the data terminal device in the transmitting mode transmits an initial signal which indicates a protocol defining the format of the data following the initial signal. However, if a data terminal device in a receiving mode fails to receive the initial signal because of noise or other interruptions, data communication cannot be maintained.

SUMMARY OF THE INVENTION

It is an object of the present invention to provide an improved data terminal device.

It is another object of the present invention to provide a simplified data terminal device which automatically corresponds the protocols of the transmitting data terminal device and the receiving terminal device.

DETAILED DESCRIPTION OF THE INVENTION

Figure 1:
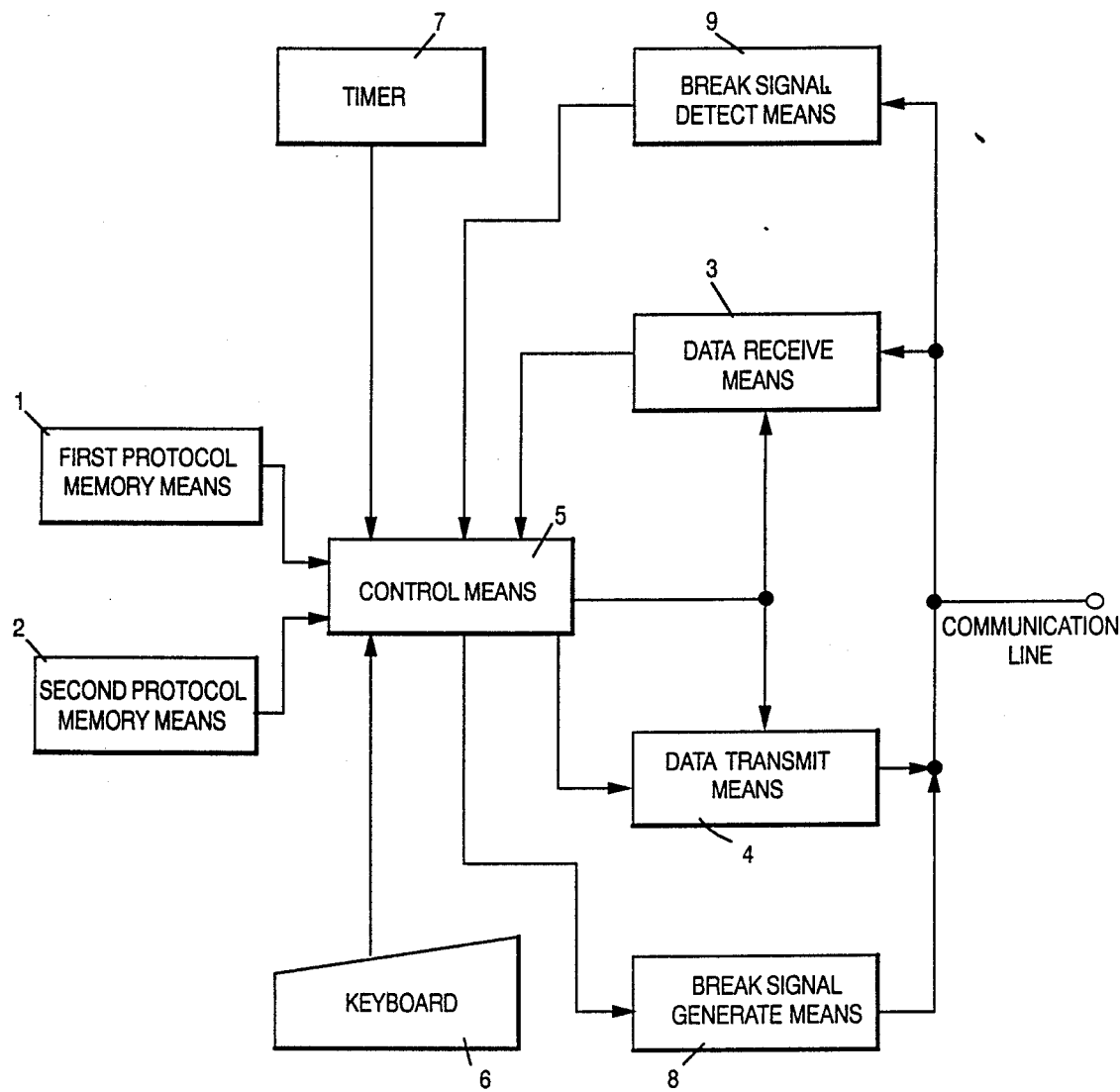
FIG. 1 is a schematic block diagram of a data terminal device according to the present invention.

Referring now to FIG. 1, there is illustrated the data terminal device of the present invention. First protocol memory means 1 stores data which represents a first protocol. Second protocol memory means 2 stores data which represents a second protocol. Both of the protocols define the band ratio, the bit numbers and other format data. Memory means 1 and 2 are solid state memory means such as a read only memory (ROM). Data receive means 3 is connected to a communication line such as a telephone line to receive data which is transmitted from another data terminal device through the communication line. Data transmit means 4 is also connected to the communication line to transmit data to the other data transmitting device through the communication line. Control means 5 contains a solid state processing unit such as a micro-processor. A control line of control means 5 is connected to the data receiving means 3 and the data transmitting means 4 to control both means. Keyboard 6 has many keys such as function keys, alphabetical keys and numerical keys. Timer 7 is connected to control means 5. Break signal generator 8 is an oscillator and generates break signals in response to commands from control means 5. Break signal generator 8 is connected to the communication line to transmit the break signals. Break signal detector 9 is connected to the communication line to detect the break signals which are transmitted from the other data terminal device through the communication line. Output lines of the first protocol memory means 1, output lines of the second protocol memory means 2, output lines of the data receiving means 3, output lines of the key board 6, output lines of the timer 7 and output lines of the break signal detector 9 are connected to an input port of control means 5. Command signal lines of control means 5 are all connected to the data receiving means 3, data transmitting means 4 and break signal generator 8. A data output line of the control means 5 is connected to the data transmitting means 4.

Figure 2:
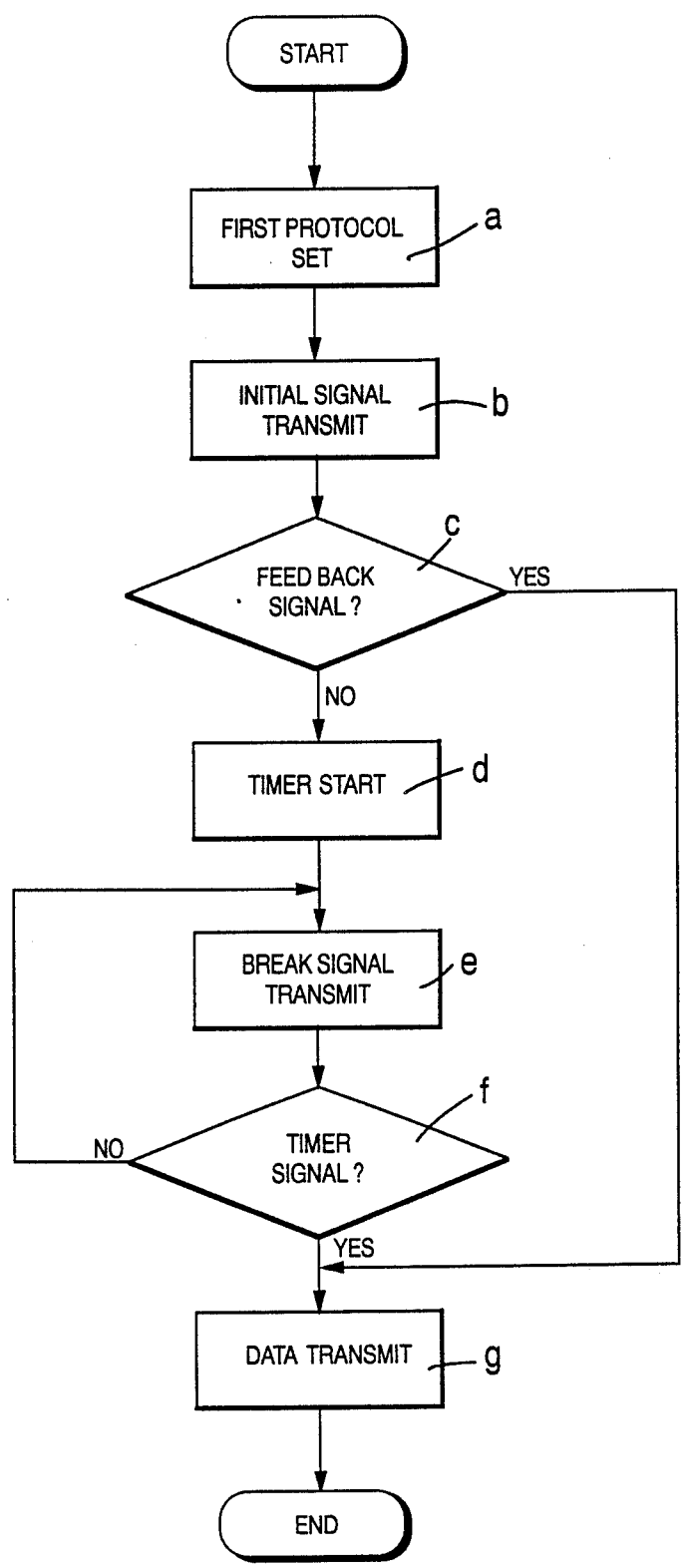
FIG. 2 is a flow chart of operation in transmitting mode of control means which is employed in the present invention.

The operation of control means 5 is now described in detail. FIG. 2 is a flow chart which shows the operation of control means 5 in the data transmitting mode. At step (a), control means 5 retrieves the data which represents the first protocol from first protocol memory means 1, and sets data transmitting means 4 to transmit data according to the first protocol. At step (b), control means 5 causes the data transmitting means 4 to transmit an initial signal. At step (c), control means 5 checks the data receiving means 3 as to whether the feed back signal has been received from the other data terminal device.

If the feed back signal has been received from the other data terminal device, control means 5 recognizes that the protocol of the other data terminal device is in accordance with the protocol of the initial signal which has been transmitted. Control means 5 then causes data transmitting means 4 to transmit data for communication. If the feed back signal is not received from the other data terminal device, control means 5 recognizes that the protocol of the other data terminal device does not coincide with the protocol of the initial signal. Then, at step (d), control means 5 commands timer 7 to start. At some time, at step (e), control means 5 causes break signal generator 8 to generate the break signals. At step (f), control means 5 maintains generation of break signal generator 8 until the lapse of the time set in timer 7. At step (g), control means 5 commands data transmitting means 4 to transmit data to be communicated.

Figure 3:
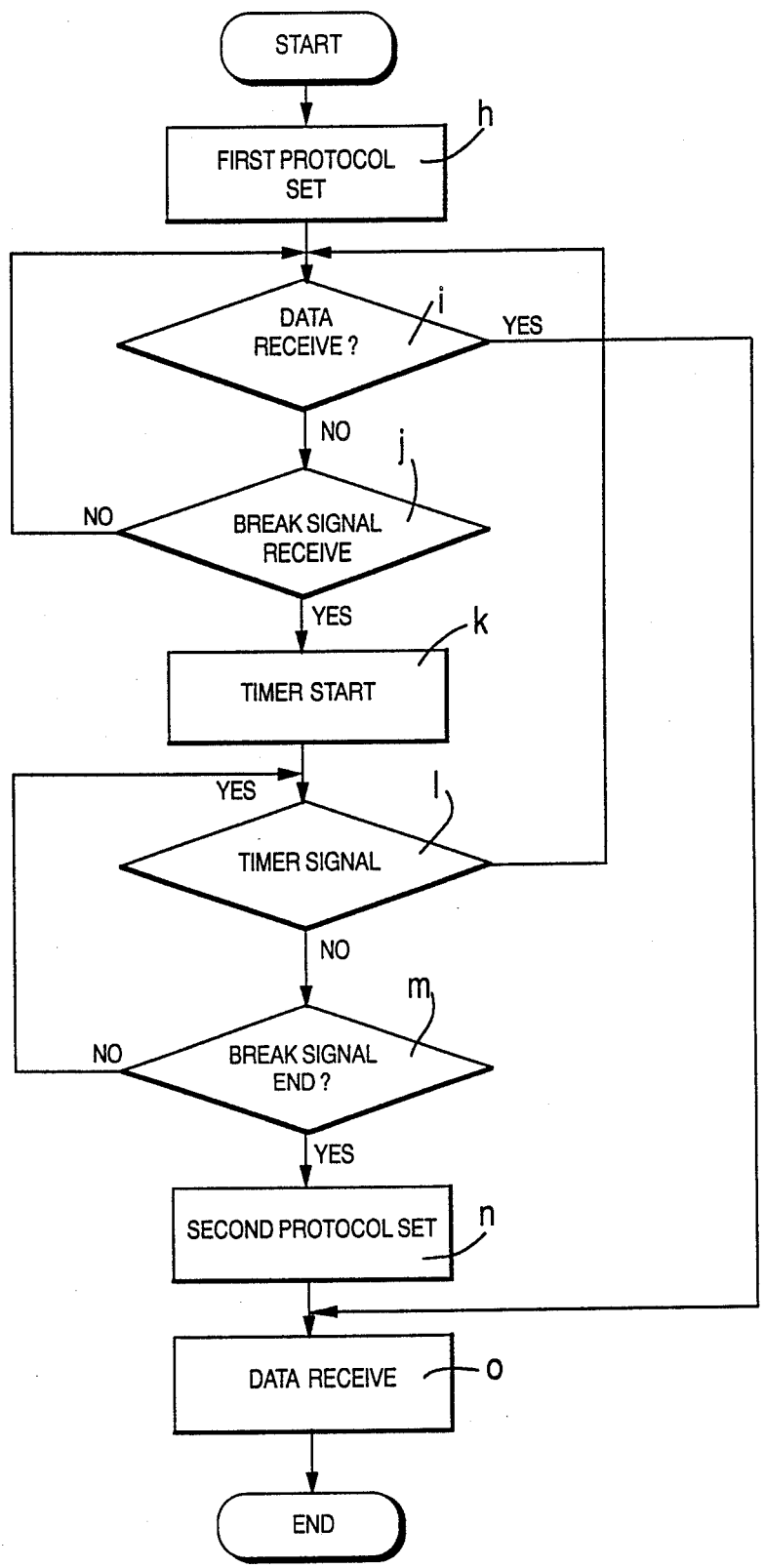
FIG. 3 is a flow chart of operation in receiving mode of control means which is employed in the present invention.

FIG. 3 is a flow chart which shows the operation of control means 5 in data receiving mode. At step (h), control means 5 retrieves the data which represents the first protocol from first protocol memory means 1, and sets data receiving means 3 to receive data from the other data terminal device according to the first protocol. At step (i), control means 5 checks data receiving means 3 as to whether the initial signal has been received from the other data terminal device. If the protocol of the initial signal coincides with the first protocol, control means 5 causes data transmitting means 4 to transmit the feed back signal and causes data receiving means 3 to receive data according to the first protocol for data communication. If the initial signal from the other data terminal device does not coincide with the first protocol, control means 5 does not command data transmitting means 4 to transmit the feed back signal.

Instead, at step (j), the checks the control means signal detector 9 as to whether the break signal has been received from the other data terminal device. If the break signal is received, control means 5 causes timer 7 to start at step (k). Control means 5 determines whether the length of the break signal is longer than the predetermined time set in timer 7 at steps (l) and (m). If the break signal is shorter than the predetermined time set in timer 7, control means 5 regards the break signal as noise and the routine returns to step (j). If the break signal is longer than the predetermined time set in timer 7, control means 5 retrieves the data for the second protocol from the second protocol memory means 2. At step (n), control means 5 commands the data transmitting means 4 to transmit the feed back signal and the data receiving means 3 to receive data from the other data terminal device according to the second protocol. At step (o), the data receiving means 3 receives data which is transmitted from other data terminal device.

As may be widely apparent, different embodiments of this invention may be made without departing from the spirit and scope thereof. It is to be understood that the invention is not limited to the specific embodiments thereof except as defined in the appended claims.

What we claim is:

1. A data terminal device, which is connected to an other data terminal device, said data terminal device comprising:

a data memory means for storing data representing a plurality of protocols;

a break signal detecting means for detecting a break signal from said other data terminal device;

a data receiving means for receiving data from said other data terminal device according to one of said protocols;

a data transmitting means for transmitting a data signal to said other data terminal device; and a control means, coupled to said data memory means, said break signal detecting means, said data receiving means, and said data transmitting means, for causing said data transmitting means to transmit a feed back signal when a protocol of a data signal from said other data terminal device coincides with a protocol of said data receiving means, and for changing said protocol of said data receiving means when said break signal detecting means detects a break signal.

2. A data terminal device, which is connected to an other data terminal device, said data terminal device comprising:

a data transmitting means for transmitting data to said other data terminal device;

a data receiving means for receiving data from said other data terminal device;

a break signal generating means for generating a break signal; and a control means, coupled to said data transmitting means, said data receiving means, and said break signal generating means, for causing said data transmitting means to transmit an initial signal, for causing said data transmitting means to transmit data for communication when said data receiving means receives a feed back signal after transmission of said initial signal, and for causing said break signal generating means to generate said break signal when said data receiving means receives no feed back signal after transmission of said initial signal, wherein said break signal is an indication to said other data terminal that a change in receiving protocol is required.

3. A data terminal device, which is connected to an other data terminal device, said data terminal device comprising:

a data memory means for storing a plurality of protocols;

a breck signal detecting means for detecting a break signal from said other data terminal device;

a break signal generating means for generating a break signal;

a data receiving means for receiving data from said other data terminal device according to one of said protocols;

a data transmitting means for transmitting data to said other data terminal device; and a control means, coupled to said data memory means, said break signal detecting means, said break signal generating means, said data receiving means, and said data transmitting means, for causing said data transmitting means to transmit a feed back signal when a protocol of a data signal from said other data terminal device coincides with a protocol of said data receiving means when in a data receiving operation, for changing said protocol of said data receiving means when said break signal detecting means detects a break signal when in a data receiving operation, for causing said data transmitting means to transmit an initial signal when in a data transmitting operation, for causing said data transmitting means to transmit data for communication when said data receiving means receives a feed back signal after transmission of said initial signal when in a data transmitting operation, and for causing said break signal generating means to generate said break signal when said data receiving means receives no feed back signal after transmission of said initial signal when in a data transmitting operation.

* * * * *